Aug. 30, 1927.
J. I. EVEREST
SNUBBER
Filed Sept. 5, 1925
1,640,651
2 Sheets-Sheet 1
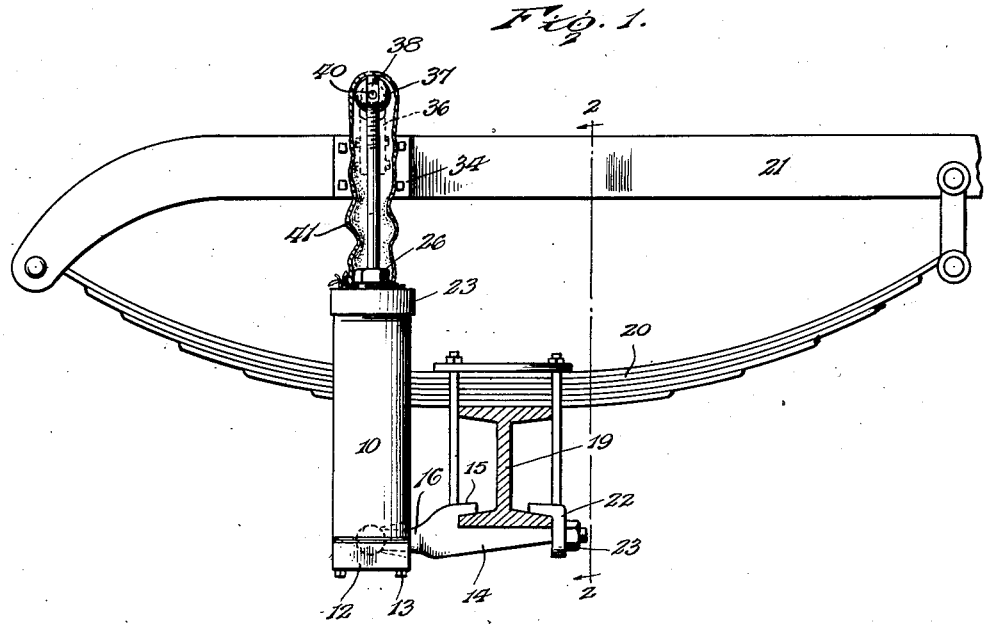
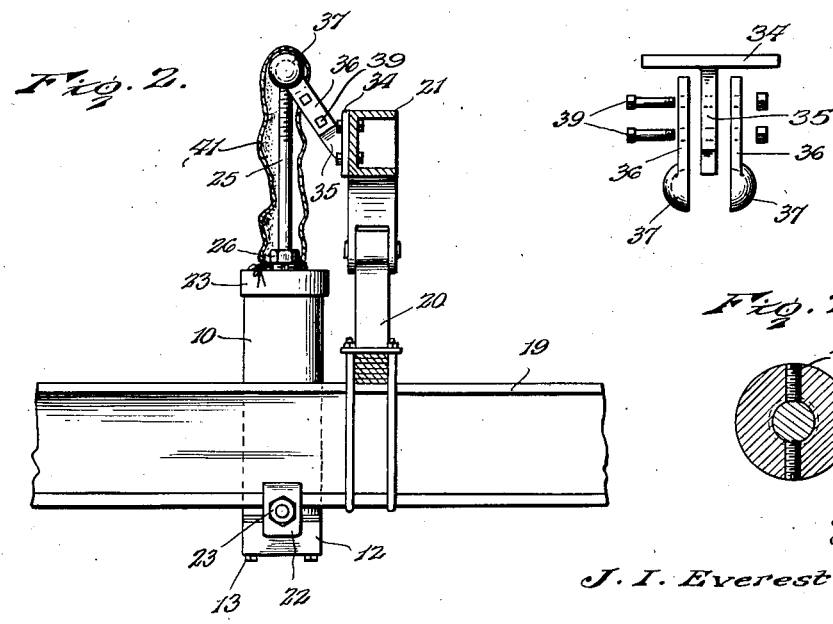
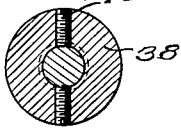
Inventor
J. I. Everest.
By Lacey & Lacey, Attorneys Aug. 30, 1927.
J. I. EVEREST
1,640,651
SNUBBER
Filed Sept. 5, 1925        2 Sheets-Sheet 2
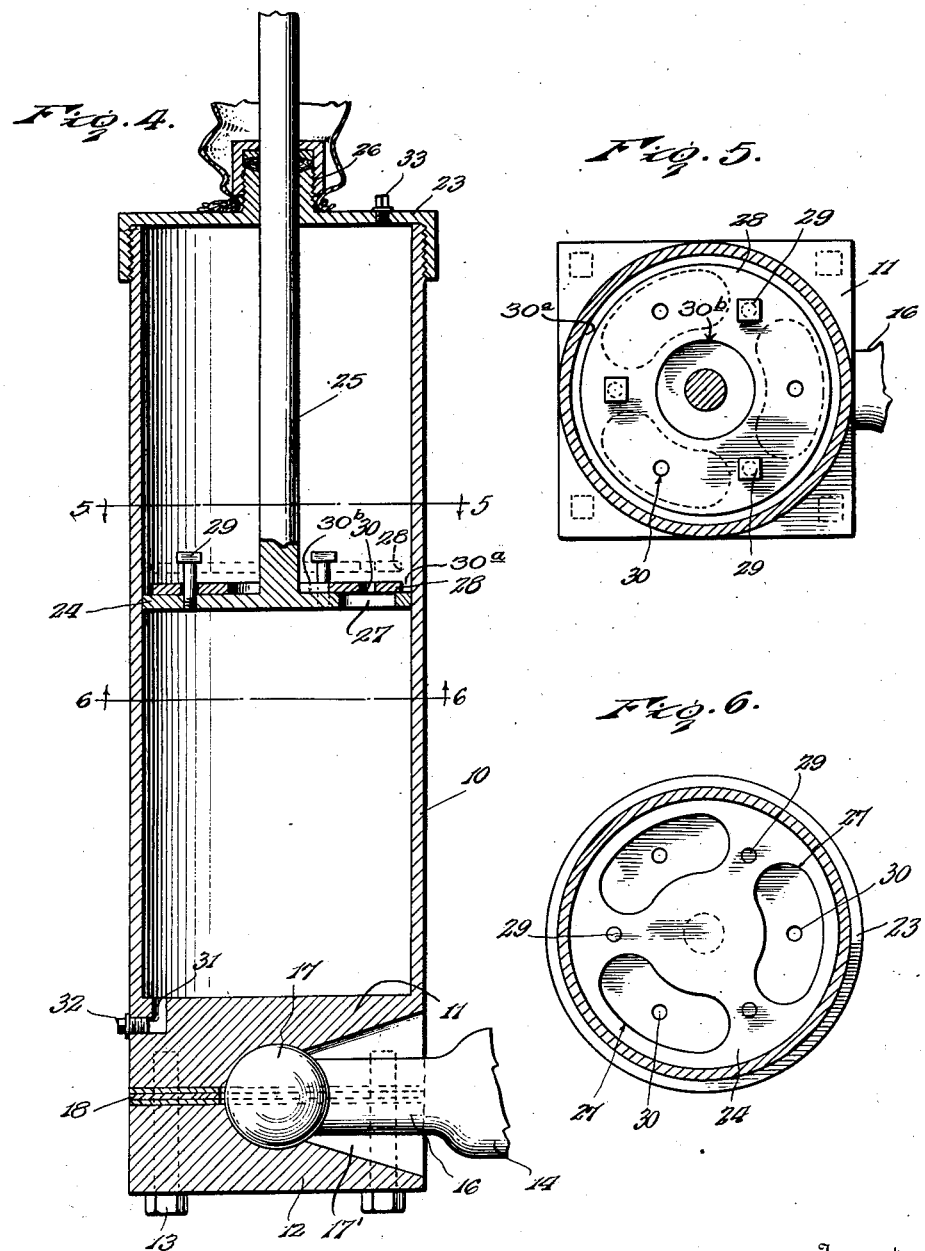
Inventor
J. I. Everest.
By Lacy & Lacy, Attorneys Patented Aug. 30, 1927.

1,640,651

UNITED STATES PATENT OFFICE.

JOSEPH I. EVEREST, OF LANGLOIS, OREGON.

SNUBBER.

Application filed September 5, 1925. Serial No. 54,763.

This invention relates to an improved snubber for motor vehicles and seeks, among other objects, to provide a device of this character which will effectually check rebound of the vehicle springs.

The invention seeks, as a further object, to provide a device of this character embodying an oil cylinder and plunger and wherein an improved valve will be provided whereby the plunger may freely shift downwardly within the cylinder but wherein upward movement of the plunger will be checked by the oil within the cylinder.

And the invention seeks, as a still further object, to provide a device adapted for general use and which may be readily applied.

Other objects of the invention not above specifically mentioned will appear as the description proceeds.

In the accompanying drawings:

Figure 1 is a side elevation showing my improved snubber applied.

Figure 2 is a sectional view on the line 2—2 of Figure 1, looking in the direction indicated by the arrows.

Figure 3 is a detail plan view of the anchoring bracket for the plunger.

Figure 4 is a vertical sectional view taken medially through the oil cylinder.

Figure 5 is a transverse sectional view on the line 5—5 of Figure 4, looking in the direction indicated by the arrows.

Figure 6 is a transverse sectional view on the line 6—6 of Figure 4, looking in the direction indicated by the arrows.

Figure 7 is a sectional view showing the mounting of the ball of the plunger rod.

In carrying the invention into effect, I employ a cylinder 10, the lower end wall of which is thickened to form a squared bearing block 11, and mating with said block is a bearing cap 12 detachably secured to the block by a plurality of cap bolts 13. Supporting the cylinder is a bracket 14 from which projects a rearwardly directed overhanging flange 15, and formed on the bracket is a cylindrical stem 16 which terminates in a ball head 17. As shown in Figure 4, the block 11 and cap 12 are recessed to form a socket for the head 17, and extending from said recess is a conical opening 17' freely accommodating the stem 16 so that the cylinder may freely rock upon the head. Interposed between the cap and block are shims 18 so that, by removing one or more of said shims, the bolts 13 may be adjusted to take up any wear occurring between the parts. In Figures 1 and 2 of the drawings, I have shown the bracket attached to the front axle 19 of a conventional motor vehicle. The adjacent front spring of the vehicle is indicated at 20 and one of the side bars of the chassis frame of the vehicle at 21. The pivotal connections between the spring and frame bar are conventionally illustrated and likewise the connection between the spring and axle is also conventionally illustrated. As will be observed, the flange 15 of the bracket 14 is engaged over the bottom flange of the axle, at the forward side of the axle, and freely fitting over the rear end of the bracket is an angle-shaped clamping plate 22 engaging over the bottom flange of the axle at the rear side of the axle. Screwed on the bracket at its rear end is a nut 23 adjustable for advancing the plate 22 and tightly binding the bracket upon the axle. Thus, the bracket may be readily attached.

Closing the cylinder 10 at its upper end is a removable screw cap 23 and reciprocable in said cylinder is a plunger 24 having a plunger rod 25 slidable through a gland 26 on the cap. As shown in Figure 6, the plunger 24 is provided with a plurality of elongated passages 27, and freely surrounding the plunger rod 25 is a flat valve 28 normally resting upon the plunger to overlie said openings. The valve is preferably formed of a metal ring, and extending freely through said valve at spaced points are upstanding cap bolts 29 screwed into the plunger and having the heads thereof disposed in spaced relation above the valve for limiting the valve in its upward movement to open position. Formed in the valve at the passages 27 are minute passages 30, one of said passages being preferably provided in connection with each of said first mentioned passages, and as will be observed, the valve is of less diameter than the plunger to provide an annular passage 30ª at the periphery of the valve while centrally thereof, the valve is provided with a relatively large opening 30ᵇ. Formed in the bearing block 11 at one edge thereof, as shown in Figure 4, is a passage 31 through which the cylinder 10 may be filled with oil, and normally closing said passage is a screw plug 32. Preferably, the cap 23 is equipped with a screw plug 33 which may be removed when the cylinder is being filled, to permit the escape of air from the cylinder.

Fixed to the side bar 21 of the vehicle chassis is a bracket 34, the base plate of which is bolted or otherwise secured to said bar, and rising from the base plate is an upwardly inclined arm 35. Overlying the arm at opposite sides thereof are socket plates 36 having hemi-spherical socket portions 37 embracing a ball head 38 on the plunger rod 25, and extending through said plates and through the arm are bolts 39 rigidly securing the plates to said arm. Thus, the bracket may be readily attached and, in this connection, it will, of course, be understood that the ball head 38 of the plunger rod is held within the socket formed by the portions 37 of the socket plates so that the ball may rock within said socket. The ball head 38 is removably screwed on the plunger rod so that the valve 28 may be readily applied or removed. Furthermore, the head may thus be adjusted longitudinally of the rod for varying the effective length of said rod to suit the requirements of different vehicles, and screwed through the head, as shown in Figure 7, are aligned set screws 40 engaging the plunger rod for securing the head in adjusted position. When these screws are removed a suitable wrench may be engaged in the openings thus vacated for removing the head. Loosely fitting over the upper end of the bracket arm 35 to enclose the ball head and its socket is a flexible boot or sleeve 41 enclosing the upper end portion of the plunger rod and tied at its lower end about the base of the gland 26. This boot may be of leather or other suitable material and, as will be seen, will protect the parts from dust and dirt.

As will be seen in view of the foregoing, when the vehicle spring 20 is flexed downwardly, the plunger 24 will be caused to descend within the cylinder 10. Accordingly, the valve 29 will be lifted by the oil within the cylinder to the dotted line position shown in Figure 4, so that the oil may freely flow through the passages 27 of the plunger between the plunger and the valve, and through the passage 30ª and opening 30ᵇ, to the upper end of the cylinder. Very little resistance will thus be offered to the downward movement of the plunger. However, upon the return of the vehicle spring, with consequent upward movement of the plunger, the valve 28 will be moved to seat against the plunger in closed position so that the oil in the upper end of the cylinder can return to the lower end of the cylinder only through the reduced passages 30 of the valve. Thus, only a gradual upward movement of the piston will be permitted so that the upward flexing of the spring will be effectually checked.

Having thus described the invention, what I claim is:

1. A snubber including a fluid cylinder, means for anchoring said cylinder, a plunger head reciprocable in the cylinder, a plunger rod extending from the plunger head through an end of the cylinder, means for anchoring said rod, the plunger head being provided with a fluid passage, and a valve freely mounted on the plunger rod and resting in closed position on the plunger head overlying the passage therethrough, said valve being provided with a restricted passage to register with the passage of the head and with a central fluid passage accommodating the plunger rod and appreciably greater than the rod in diameter.

2. A snubber including a fluid cylinder, means for anchoring said cylinder, a plunger head reciprocable in the cylinder, a plunger rod extending from the head through an end of the cylinder, means for anchoring said rod, the plunger head being provided with a fluid passage, a valve freely surrounding the plunger rod and resting in closed position on the plunger head overlying said passage, said valve being provided with a restricted passage to register with the passage of the head, and devices carried by the head and extending through the valve to guide the valve and limit its movement away from the plunger head to open position.

3. A snubber including a fluid cylinder, means for anchoring said cylinder, a plunger reciprocable in the cylinder and having a plunger rod, means for anchoring said rod, the plunger being provided with fluid passages, a valve disc freely surrounding the plunger rod and movable to closed position resting on the plunger and overlying said passages, said disc being provided with a restricted passage to register with the passage of the plunger, and cap bolts carried by the plunger and extending freely through the valve, the heads of said bolts in spaced relation to the valve limiting the movement of the valve away from the plunger to open position.

4. A snubber including a fluid cylinder having an end wall providing a bearing block, a bearing cap mating with said block, a bracket provided with a head confined between said block and the cap and supporting the cylinder for rocking movement, a plunger reciprocable in the cylinder and freely movable in one direction therein, means for anchoring the plunger, and a valve carried by the plunger for checking movement thereof in the opposite direction.

5. A snubber including a fluid cylinder, means for anchoring said cylinder, a plunger reciprocable in the cylinder and having a plunger rod provided with a head, a bracket provided with an arm, and socket plates fixed to the arm and provided with socket portions embracing said head for pivotally connecting the plunger rod with said bracket.

In testimony whereof I affix my signature.

JOSEPH I. EVEREST.